United States Patent

Grego et al.

[15] 3,650,720

[45] Mar. 21, 1972

[54] DECORATING GLASS-CERAMIC ARTICLES

[72] Inventors: Peter Grego, Corning; Theodore R. Kozlowski, Horseheads; Peter M. Schuyler, Otego, all of N.Y.

[73] Assignee: Corning Glass Works, Corning, N.Y.

[22] Filed: Nov. 14, 1969

[21] Appl. No.: 877,053

[52] U.S. Cl. ........................................65/30, 65/31, 65/60, 117/124 B, 65/3, 65/116, 65/182
[51] Int. Cl. ..................................C03c 15/00, C03c 17/00
[58] Field of Search ..........................65/30, 31, 60, 116, 182; 117/124 B

[56] References Cited

UNITED STATES PATENTS

| | | | |
|---|---|---|---|
| 3,231,456 | 1/1966 | McMillan et al. | 65/30 X |
| 3,313,644 | 4/1967 | Morrissey | 65/30 X |
| 3,464,806 | 9/1969 | Seki et al. | 65/30 X |
| 3,468,745 | 9/1969 | Navez et al. | 65/30 X |
| 2,701,215 | 2/1955 | Kroeck | 65/30 X |
| 3,498,775 | 3/1970 | Simmons | 65/30 X |
| 3,528,847 | 9/1970 | Grego et al. | 65/30 X |
| 3,287,201 | 11/1966 | Chisholm et al. | 65/30 X |
| 3,495,963 | 2/1970 | Buckley et al. | 65/30 |
| 3,529,946 | 9/1970 | Fisher | 65/30 |
| 3,441,399 | 4/1969 | Levene et al. | 65/30 X |

*Primary Examiner*—Frank W. Miga
*Attorney*—Clarence R. Patty, Jr. and Clinton S. Janes, Jr.

[57] ABSTRACT

This invention relates to the decorating of $Li_2O$ and/or $Na_2O$-containing glass-ceramic articles through the stain coloring thereof utilizing copper and/or silver ions, these articles being subsequently chemically strengthened through an ion exchange reaction of the large-ion-for-small-ion type carried out in a bath of molten salt. More specifically, the present invention is concerned with the prevention of unsightly defects which can occur in the stain coloring during the chemical strengthening process. This is accomplished by passing sulfur dioxide gas through the bath of molten salt.

1 Claims, No Drawings

DECORATING GLASS-CERAMIC ARTICLES

A glass-ceramic article is manufactured through the controlled crystallization in situ of a glass article. In general, the manufacture thereof comprises three principal steps: first, a glass-forming batch is compounded to which a nucleating or crystallization-promoting ingredient is commonly admixed; second, the batch is melted and this melt then simultaneously cooled and shaped to a glass article of a desired configuration; and, third, the glass article is thereafter heat treated according to a predetermined time-temperature schedule such that nuclei are initially developed within the glass which act as sites for the growth of crystals thereon as the heat treatment proceeds.

Inasmuch as the crystallization is effected through the essentially simultaneous growth on countless nuclei, the structure of a glass-ceramic article comprises relatively uniformly sized, fine-grained crystals homogeneously dispersed in a glassy matrix, these crystals constituting the predominant proportion of the article. Hence, glass-ceramic articles are frequently delineated as being at least 50 percent by weight crystalline and, in many instances, are actually over 75 percent by weight crystalline. Because of this very high crystallinity, the chemical and physical properties of glass-ceramic articles are usually materially different from those of the parent glass and are more closely akin to those demonstrated by the crystals. Finally, the residual glassy matrix will have a far different composition from that of the parent glass since the crystal components will have been precipitated therefrom.

U.S. Pat. No. 2,920,971, the basic patent in the field of glass-ceramics, provides an extensive study of the practical aspects and the theoretical considerations involved in the manufacture of such articles as well as a discussion of the crystallization mechanism and reference thereto is made for further explanations of these factors.

The color staining of glass-ceramic articles with copper and/or silver is disclosed in U.S. application Ser. No. 762,364. As is explained therein, the copper and silver staining of glass articles has been practiced for many years and the mechanism therefor merely involves the direct substitution of one metal coloring ion for one alkali metal ion which results in a color center being formed that grows to a particular size. The size of the color center will not vary significantly with changes in pretreatment of the glass or in ion exchange firing schedules. However, the mechanism of ion exchange in glass-ceramic articles is different from that obtaining in glass articles.

Thus, glass-ceramic articles consist of minute crystals dispersed in a glassy matrix, the number and size of the crystals being related to the crystallization in situ heat treatment employed. Therefore, in dealing with ion exchange in glass-ceramic articles, three mechanism paths are undertaken. First, there is an exchange of the metal coloring ions with alkali metal ions, if any, left in the glassy matrix. Second, the metal coloring ions exchange with structural alkali metal ions in the crystals, themselves. Third, the metal coloring ions can assume interstitial positions in the lattices of the crystals.

Therefore, the number of coloring ions which can be exchanged in a glass-ceramic article is dependent upon the size of the crystals which, in turn, is a function of the heat treating schedule utilized. Furthermore, the final color developed has also been found to be dependent upon the temperature of the ion exchange treatment which controls the number of metal coloring ions diffusing into the surface of the article. Hence, the size of the color center which, in turn, governs the color developed, varies with both the crystallization heat treatment and the ion exchange schedule employed. This observation is contrary to that obtaining in glass articles wherein only the intensity, not the color, varies with changes in ion exchange firing schedule.

That patent application observed that glass-ceramic articles containing lithium, sodium and/or potassium ions, which were to be color stained with copper and/or silver ions, did not color stain readily when the crystallization heat treatment employed was less than about 850° C., with 1,200° C. being deemed a practical maximum. Therefore, the crux of the invention encompassed in Ser. No. 762,364 comprises coating a surface of a glass-ceramic article, which has been crystallized in situ from a glass article at a temperature between about 850°–1,200° C., with a paste consisting essentially of a metal coloring ion, a diluent consisting of $Al_2O_3$ and/or $TiO_2$ and/or $ZrO_2$, a plasticizer, and a wetting agent and, thereafter, heating the coated article to about 500°–850° C. for sufficient time to enable an ion exchange to occur between alkali metal ions present therein and the metal coloring ions. The copper and/or silver ions are commonly introduced at $Ag_2S$, $Ag_2SO_4$, $AgNO_3$, $CuS$, $CuSO_4$, and/or $CuCl$. Further details concerning the process variables and the staining mechanism involved can be gleaned from a study of Ser. No. 762,364 and specific reference is hereby made thereto.

Although glass-ceramic articles are inherently stronger than the glass articles from which they are made, e.g., a modulus of rupture ranging between 10,000–15,000 p.s.i. as compared with about 5,000–8,000 p.s.i., even higher strengths would obviously be desirable. Thus, relatively thin glass-ceramic panels of large area dimensions have recently been utilized as building siding. For such an application, higher mechanical strengths are mandatory for such products to be commercially successful. This need has led to the chemical strengthening of the panels subsequent to the color staining process.

The chemical strengthening of glass-ceramic articles through the exchange in a surface layer within the article of larger ions from an external source with smaller ions present in the crystals comprising the article is disclosed in such Canadian Patents as Nos. 768,569 and 673,174. Hence, Canadian Pat. No. 768,569 disclosed the exchange of sodium ions from a bath of a molten sodium salt with lithium ions in crystals of beta-spodumene, whereas Canadian Pat. No. 673,174 deals with the exchange of potassium ions from a bath of a molten potassium salt with sodium ions in crystals of nepheline. In general commercial practice, molten $NaNO_3$ and $KNO_3$ constitute the sources of $Na^+$ and $K^+$ ions. The strengthening of the glass-ceramic articles is normally undertaken after the color-staining procedure since conducting the color-staining process subsequent thereto commonly results in loss of strength through the exchange of the coloring ions with the "strengthening" ions and stress release in the surface due to the high temperatures required in the color-staining process. However, color-stained articles exhibiting modulus of rupture values greater than 30,000 p.s.i. and, frequently, greater than 50,000 p.s.i. have been achieved through the subsequent chemical strengthening process.

In the production of color-stained glass-ceramic panels for building cladding utilizing copper and/or silver as the colorant, it was observed that when the surface of the panel became scratched, either before or after the color-staining step, the scratches would become "developed" during the chemical strengthening process utilizing baths of molten $NaNO_3$ or $KNO_3$. These "developed" scratches were usually silver to yellow in color and corresponded in detail to the scratches which were on the surface of the panels.

Although care is exercised, scratches frequently result in the surface of the panels in the handling thereof. These scratches are essentially unnoticeable prior to the strengthening process but their "development" thereby markedly detracts from the appearance of the final products.

Therefore, the primary object of this invention is to provide a method for preventing the "development" of these scratches during the chemical strengthening of $Li_2O$ and/or $Na_2O$-containing glass-ceramic articles which have been previously color stained with copper and/or silver.

Analyses of the developed scratches indicated the presence of metallic copper and/or silver. Thus, the copper and/or silver oxide in the stain had been reduced to the metal. The source of this reduction was determined to be sodium or potassium nitrite formed in the baths of molten $NaNO_3$ and $KNO_3$. The mechanism of the scratch development is not fully understood but mechanical abrading of the glass-ceramic surface apparently renders the stain more accessible to the molten salt and increases the probability of a reaction with the stain. The formation of $NaNO_2$ or $KNO_2$ in molten $NaNO_3$ and $KNO_3$ results from the thermal decomposition of the latter according to:

$$NaNO_3 \rightleftarrows NaNO_2 + \tfrac{1}{2}O_2$$
$$KNO_3 \rightleftarrows KNO_2 + \tfrac{1}{2}O_2$$

Empirical testing demonstrated that the critical level of $NaNO_2$ and/or $KNO_2$ was about 0.25 percent by weight, i.e., the level of $NaNO_2$ and/or $KNO_2$ must be maintained below about 0.25 percent by weight in order to forestall scratches from being developed on the surface of the color-stained glass-ceramic during the subsequent ion exchange strengthening step utilizing a bath of molten $NaNO_3$ and/or $KNO_3$.

We have discovered that nitrite can be removed from the bath of molten nitrate salt without deleteriously affecting the strengthening potential of the bath by bubbling sulfur dioxide therethrough. The by-products of the reaction are gaseous which escape from the bath with $Na_2SO_4$ and/or $K_2SO_4$ being formed which is compatible with the molten salt system. The overall mechanism for the removal of nitrite from the nitrate comprises two reactions:

$$SO_2 + 2NaNO_2 \text{ and/or } 2KNO_2 \rightarrow Na_2SO_4 \text{ and/or } K_2SO_4 + \tfrac{1}{2}NO + \tfrac{1}{2}NO_2 + \tfrac{1}{2}N_2O$$

$$NO_2 + NaNO_2 \text{ and/or } KNO_2 \rightarrow NaNO_3 \text{ and/or } KNO_3 + NO$$

Thus, not only is nitrite removed from the molten salt but there is some regeneration of nitrate therefrom.

The reaction of $SO_2$ with nitrite is extremely rapid such that it is normally diluted with air, oxygen, argon, helium, or some other inert gas prior to bubbling through the melt. Hence, in commercial production, the $SO_2$ is diluted with air and then flowed relatively slowly into the molten salt. It has been demonstrated that the bubbling of air alone therethrough does not affect the concentration of nitrite in the bath.

The crux of our invention, therefore, is the discovery of a method for preventing the development of scratches in glass-ceramic articles which had been color stained with copper and/or silver ions during a subsequent chemical strengthening process utilizing a bath containing molten $NaNO_3$ and/or $KNO_3$ as the source of exchangeable ions. Nitrate baths are commonly used commercially since there is very little chemical attack of a glass or glass-ceramic surface therefrom.

As has been explained hereinabove, our invention is adaptable to any $Li_2O$ and/or $Na_2O$-containing glass-ceramic composition, the presence of the $Li^+$ and $Na^+$ ions being demanded for the color-staining reaction and the subsequent ion exchange strengthening step utilizing a bath of molten $NaNO_3$ and/or $KNO_3$ to provide exchangeable $Na^+$ and/or $K^+$ ions. For further examples of operable glass-ceramic compositions, reference is made to U.S. Pat. No. 2,920,971, supra, and Canadian Pat. Nos. 768,569 and 673,174. However, to further demonstrate our invention, the following two specific examples are reported which must be deemed merely illustrative and not limiting:

EXAMPLE I

Glass-ceramic panels 8 feet × 4 feet × ¼ inches having a composition, in weight percent on the oxide basis, of about 63.9% $SiO_2$, 19.9% $Al_2O_3$, 2.2% $B_2O_3$, 0.4% $Na_2O$, 0.2% $K_2O$, 1.7% $MgO$, 0.1% $CaO$, 2.5% $ZnO$, 3.6% $Li_2O$, 4.5% $TiO_2$, and 1.0% $As_2O_3$ and having been crystallized in situ at 860° C. for one-half hour to highly crystalline products, wherein beta-spodumene constituted the principal crystal phase, were color stained in the following manner. A staining paste was prepared by ballmilling together 34.5 parts by weight $Ag_2S$, 6 parts by weight CuS, 84.2 parts by weight $TiO_2$, 10 parts by weight bentonite, 0.3 part by weight ligno-sulfonate, and 150 parts by weight $H_2O$ to give a viscosity to the paste of about 5–10 poises. The paste was then sprayed onto the panels to a thickness between about 2.5–4.5 mils and then dried for 5 minutes at 150° C. Thereafter, the coated panels were fired at 575° C. for 30 minutes to effect an exchange in the surfaces thereof between the copper and silver ions and the alkali metal ions present therein. A dark bronze stain resulted in the surface of the panels.

The panels were then immersed into a bath of molten $NaNO_3$ to be ion exchange strengthened, i.e., $Na^+$ ions from the bath were exchanged for $Li^+$ ions in the crystals present within a surface layer on the panels. An analysis of a bath containing 100,000 pounds of molten $NaNO_3$ which had been operating at 475° C. for 2 weeks in the ion exchange strengthening of the above panels indicated a level of $NaNO_2$ therein of 0.57 percent, i.e., about 570 pounds of $NaNO_2$ were in the bath. Any scratches on the panels were well developed. A 10:1 mixture of air:$SO_2$ was then flowed into the bath at a rate of about 5–7 liters/second and periodic analyses made of the melt therein. After the air-$SO_2$ mixture had been bubbled into the bath for about 10 hours (equivalent to about 150 pounds of $SO_2$), the $NaNO_2$ level had been reduced to 0.22 percent or about 220 pounds of $NaNO_2$ remaining in the bath and no scratch development was observed. Panels treated when the bath analyzed about 0.25% $NaNO_2$ demonstrated barely discernable developed scratches. This level of $NaNO_2$ could be reduced by continuing the flow of the same air:$SO_2$ mixture at that rate or merely maintained at that safe level by increasing the dilution of air:$SO_2$ up to about 20:1. This latter alternative was considered more economically sound.

EXAMPLE II

Glass panels 2 feet × 2 feet × ¼ inches having a composition, in weight percent on the oxide basis, of about 44.1% $SiO_2$, 31.5% $Al_2O_3$, 16.7% $Na_2O$, 7.4% $TiO_2$, and 0.3% $As_2O_3$ were crystallized in situ according to the following schedule: heat from room temperature to 850° C. at 200° C./hour, hold at 850° C. for 2 hours, heat to 1,110° C. at 200° C./hour, hold at 1,110° C. for 2 hours, and then cool to room temperature. A highly crystalline product resulted wherein nepheline constituted the principal crystal phase. These glass-ceramic panels were color stained in like manner to that reported in Example I with the final color being a pink-red.

The panels were then immersed into a bath of molten $KNO_3$ to be ion exchange strengthened, i.e., $K^+$ ions from the bath were exchanged for $Na^+$ ions in the crystals present within a surface layer on the panels. An analysis of a bath containing 100,000 pounds of molten $KNO_3$ which had been operating at 525° C. for 2 weeks in the ion exchange strengthening of the pieces indicated a level of $KNO_2$ therein of 0.75 percent. Scratches on the pieces were well developed. A 10:1 mixture of air:$SO_2$ was bubbled into the melt at a rate of about 5–7 liters/second and periodic analyses made thereof. After the air-$SO_2$ mixture had been flowed into the bath for about 15 hours (equivalent to about 200 pounds of $SO_2$), the $KNO_2$ had been reduced to 0.20 percent and no scratch development was observed. Panels chemically strengthened when the bath analyzed about 0.25% $KNO_2$ exhibited barely discernable developed scratches. The $KNO_2$ level of the batch could be adjusted or maintained in like manner to that described in Example I for $NaNO_2$.

Although these two examples reflected the utility of this invention with a highly contaminated bath, it will be appreciated that, instead of waiting until the bath of molten salt causes the extensive "development" of unsightly scratches before beginning the $SO_2$ treatment thereof, brief periods of gas flow at empirically spaced time intervals could be employed or essentially continuous flow at low $SO_2$ volume would likewise be effective. Also, the rate at which $SO_2$ is passed into the bath is important only in that the quantity thereof is adequate to reduce and/or maintain the level of $NaNO_2$ and/or $KNO_2$ below about 0.25 percent. Obviously, excessive amounts will merely increase production costs and excessive flow rates can cause unnecessary turbulence in the bath.

In any event, it is believed that all these factors can be readily determined empirically and, therefore, are deemed to be well within the technical competence of one of ordinary skill in the art.

We claim:

1. In the method for chemically strengthening a color stained $Li_2O$ and/or $Na_2O$-containing glass-ceramic article,
   a. said glass-ceramic article having been crystallized in situ at a temperature between about 850°–1,200° C. and then color stained by first coating a surface portion thereof with a staining paste consisting essentially of silver and/or copper ions, at least one diluent selected from the group consisting of $Al_2O_3$, $TiO_2$, and $ZrO_2$, a plasticizer, and a wetting agent, and thereafter firing at a temperature between about 500°–850° C., and
   b. said strengthening involving the immersion of said article into a bath containing molten $NaNO_3$ and/or $KNO_3$ to cause an exchange of $Na^+$ and/or $K^+$ ions for $Li^+$ and/or $Na^+$ ions in the crystals of said article, said bath normally having the capability of accentuating the color development of scratches present in the surface of said article on account of the presence of minor amounts of $NaNO_2$ and/or $KNO_2$ therein;

the improvement which comprises bubbling $SO_2$ through the molten bath to maintain the level of $NaNO_2$ and/or $KNO_2$ therein below about 0.25 percent by weight, thereby avoiding said accentuation of color development of scratches present in the surface of said article.

* * * * *